United States Patent [19]

Hoff

[11] 4,326,368
[45] Apr. 27, 1982

[54] CLUTCH AND BRAKE FOR ROTARY LAWN MOWER

[75] Inventor: Stephen J. Hoff, Richmond, Ind.

[73] Assignee: Hoffco, Inc., Richmond, Ind.

[21] Appl. No.: 158,700

[22] Filed: Jun. 12, 1980

[51] Int. Cl.³ ............................................. A01D 69/10
[52] U.S. Cl. ................................... 56/11.3; 192/17 R
[58] Field of Search ............ 56/11.3; 192/17 R, 17 A, 192/17 C, 107 M; 74/572

[56] References Cited

U.S. PATENT DOCUMENTS

| | | | |
|---|---|---|---|
| 1,836,439 | 12/1931 | Buehler | 74/445 |
| 3,253,391 | 5/1966 | Meldahl | 192/17 |
| 4,035,994 | 7/1977 | Hoff | 192/17 |
| 4,044,533 | 8/1977 | Wick | 192/17 |
| 4,098,142 | 7/1978 | Weyler | 74/572 |
| 4,226,313 | 10/1980 | Meldahl et al. | 56/11.3 |

*Primary Examiner*—Robert A. Hafer
*Attorney, Agent, or Firm*—Jenkins, Coffey, Hyland, Badger & Conard

[57] ABSTRACT

A lawn mower blade clutch-brake mechanism having a driving drum and a driven blade carrier, the carrier having clutch shoes engageable with the inside of the drum and brake drum segments fixed to the shoes and disposed outside the drum for engagement by an encircling brake band which both applies braking drag and mechanically forces the segments inward to disengage the clutch shoes, and including the improvement that the clutch shoes are pivoted to the carrier at their leading ends in the direction of rotation so as to be aggressive and self-energizing, and the segments are pivoted on the same pivots and have trailing ends which are swung outward from a cylindrical position concentric with the axis of rotation when the clutch shoes are engaged so that the segments are first engaged by the brake band at and in the direction of their outward sloping trailing ends. The segments preferably also have leading ends extending forward beyond the pivot points, which swing inward from concentric position so as to clear the brake band during its initial engagement. Desirably, the clutch shoes are steam-treated, powdered-iron parts and the drum is hardened steel. The mechanism may include a flywheel and is especially compact and adapted to be mounted on an engine shaft without modification of the engine. The particular construction facilitates economical manufacture and improved operation.

16 Claims, 7 Drawing Figures

CLUTCH AND BRAKE FOR ROTARY LAWN MOWER

This invention relates to a clutch and brake mechanism especially adapted for controlling the operation of the rotary blade of a rotary-blade lawn mower.

The lawn mower industry has been working for many years to improve the operation and especially the safety of lawn mowers which cut with an elongated blade rotating at relatively high speed in a horizontal plane. On Mar. 27, 1962, the present applicant was granted U.S. Pat. No. 3,026,665 for a lawn mower blade mounting and control which included a centrifugal clutch having driving shoes mounted on the vertical shaft of the engine and engageable with the inside surface of a drum on a blade carrier rotatable axially with such shaft, and a brake band engageable with the outer surface of such drum. The blade would be declutched and stopped when the operator released a deadman control lever on a handle of the lawn mower which was connected to apply the brake and also to move the engine throttle to reduce the engine speed.

On July 22, 1974, the Consumer Product Safety Commission commenced a proceeding to develop, and on Feb. 26, 1979 promulgated, a safety standard for walk-behind power lawn mowers which requires that all lawn mowers manufactured after Dec. 31, 1981, must have a control ("deadman control") and a blade control system which will (1) prevent the blade from operating unless the operator actuates the control, (2) require continuous contact with the control in order for the blade to continue to be driven, and (3) cause the blade to stop within three seconds after release of the control. (Federal Register, Vol. 44, No. 33, Feb. 15, 1979, pp. 9990 et seq., 9993.)

Hugh A. Zindler and Sheldon D. Pollow, in an application filed prior to May 27, 1976, and Gerald H. Wick, in U.S. Pat. No. 4,044,533, granted on an application filed May 27, 1976, proposed a lawn mower blade clutch and brake mechanism in which the blade driving shaft carried a driving drum and the blade carrier rotatable coaxially therewith carried clutch shoes engageable with the inside of such drum and fixed to brake drum segments spaced radially outward of the clutch shoes and the driving drum in a position to be engaged by an encircling brake band which, when contracted against the brake drum segment (1) mechanically forced such segments inward and thereby disengaged the clutch shoes, and (2) applied braking force to the segments so as to brake the carrier and blade to a stop. While this proposal seemed to offer considerable promise of providing a desirable clutch and brake mechanism for meeting Consumer Product Safety Commission standards and to improve the safety of rotary-blade lawn mowers, the clutches shown were not altogether satisfactory.

It is the object of the present invention to provide an improved clutch and brake mechanism of the Zindler-Pollow-Wick type, which, in a compact mechanism, will provide a positive drive from the engine to the rotary lawn mower blade when the deadman control is actuated and positive clutch disengagement and prompt stopping of the blade when the control is released, which will give smooth clutch engagement and a smooth and effective braking action, which will be long lived, which will meet the aforesaid safety standards, and indeed stop the blade much faster than required by such standards, which may include a flywheel to replace the flywheel effect of the blade, and which will be adapted for simple control and for use on various lawn mower engines.

In accordance with the invention, the driving drum carried by the driving shaft is engaged on its inner face by clutch shoes which are pivoted on pivots adjacent their leading ends and have clutch faces which lie in a trailing position when engaged by the driving drum so that they have a substantial self-energizing action. Such clutch shoes are fixed to brake drum segments disposed outward of the driving drum which are substantially longer than the clutch shoes and so oriented with respect to such shoes that their leading ends extend a substantial arcuate distance forward in the direction of rotation beyond the position of the pivot axis of the shoes and also have a long trailing portion, say two to four times as long as the leading portion. Each brake drum segment carried with a clutch shoe is desirably a cylindrical segment adapted to pivot to a cylindrical position concentric with the axis of rotation, but with a center of curvature displaced angularly about the shoe pivot axis from the center of curvature of the clutch face of the shoe to which the brake drum segment is fixed. This arrangement provides not only that the brake drum segments will add their mass to that acted on by centrifugal force to engage the clutch shoes, but also, and more importantly, will provide that when the clutch shoe faces are in engagement with the cylindrical inner surface of the driving drum, the trailing ends of the brake drum segments will be swung outward and their leading ends swung inward from concentricity with the axis of rotation, and hence that the segments will be disposed with their leading ends retracted from a true cylindrical configuration and with their brake faces lying at a distance from such axis of rotation which progressively increases from such leading ends to the braking ends.

The brake drum segments are encircled by a brake band, desirably of nearly complete circumferential extent which is adapted to take a circular disengaged position surrounding and in clearance relation with the brake drum segments. With such segments oriented and disposed as described, their leading ends will be most widely spaced from the encircling brake band when the latter is in disengaged position and their braking surfaces will lie in a spiral at a progressively increasing distance from the axis of rotation and a progressively decreasing distance from the encircling brake band. Accordingly, as the brake band is contracted toward braking engagement with the brake drum segments, it will initially engage the trailing outermost portions of such segments, and the leading ends will stand substantially clear and free of the engaging band so as to ride across the break in the brake band. In consequence, the initial result of brake band engagement will be to mechanically force the trailing ends of the brake band segments inward against the shoe-biasing springs and against the centrifugal force acting on the shoes, and such engagement will overcome such forces and mechanically move the clutch shoes to disengaged position. As the brake drum segments approach or reach a position of concentricity with the axis of rotation, they are desirably stopped against further swinging movement. Contraction of the brake band against the segments not only forces them inward, but the braking drag on the segments tends to pivot them rearward and hence produces a self-actuation of the shoe assemblies in a direction to disengage the clutch shoes. The arrangement makes it feasible and desirable to use a brake band having a soft frictional lining and thus to provide a smooth brake engagement. Desirably, the driving drum has a hardened inner surface, preferably hardened steel, and the clutch shoes are powdered metal parts which are preferably powdered iron parts which are steam-treated after the shoes are formed so as to form iron oxides in the pores of the powdered metal part.

Other features and relationships in accordance with the present invention are exemplified by the specific embodiments shown in the accompanying drawings and described in the following description.

The accompanying drawings illustrate the invention and show a preferred embodiment exemplifying the best mode of carrying out the invention as presently contemplated. In such drawings.

Figure 1:
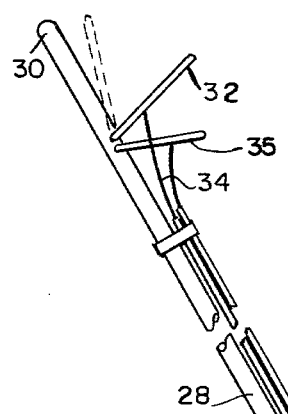
FIG. 1 is a side elevation of a lawn mower of the type to which the invention is especially adapted for use.

The lawn mower shown in FIG. 1 comprises a deck or housing 10 having a deck 11 supported on wheels and carrying an internal combustion engine 12 which is mounted by a mounting flange 14 about a central opening 16 in the deck of the housing and has a vertical shaft 18 projecting downward and carrying a rotary cutter blade 20 at its lower end. The blade 20 is connected to the shaft and controlled by a clutch and brake assembly 22 mounted within a protective bowl 24 carried below the deck of the housing by the engine-mounting bolts 26. The lawn mower has a handle 28 extending rearwardly and upward to a transverse handhold 30. Such handle carries a deadman control handle 32 pivoted for movement between a forward released position shown in full lines and an actuated position shown in dotted lines in which it lies adjacent the handhold 30 where it can be conveniently held by the hand of an operator. The deadman control lever 32 is connected by a cable 34 to control mechanism for the clutch and brake assembly. A separate control 36 is connected to an engine throttle or governor level 36 by a cable 128 in a sheath 130.

Figure 2:
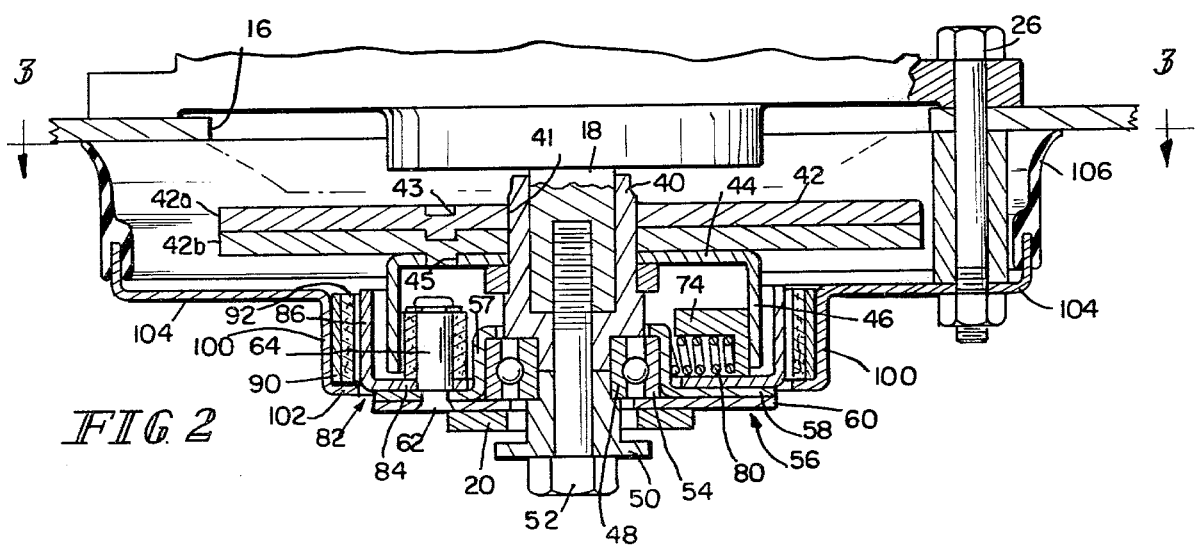
FIG. 2 is a vertical section on the axis of the engine shaft of such lawn mower, showing a clutch and brake mechanism in accordance with the invention.

The clutch and brake mechanism shown in FIG. 2 and subsequent figures comprises a hub 40 mounted on the engine shaft 18 and keyed thereto, and which carries a flywheel 42 and a clutch-driving member 44 having an outer depending cylindrical wall or drum 46. The flywheel 42 is made of two heavy-gauge stampings formed with polygonal, preferably twelve-sided, central openings 41 which interengage with a corresponding shape on the upper end of the hub 40 so as to form a strong driving connection between the hub and the flywheel. The two flywheel plates 42a and 42b are each formed with a plurality, e.g., three, angularly spaced half perforations 43 which produce pockets in the top face of the plate and downward projecting studs on the bottom of the plate. The studs of the top plate 42a are engaged in the pockets of the lower plate 42b, while the studs of the plate 42b are engaged in holes 45 in the radial flange of the driving member 44. The two plates and the driving member are thus securely locked to each other and to the hub 40. The driving drum lies axially close to the flywheel and extends downward with its open end at the bottom.

Figure 3:
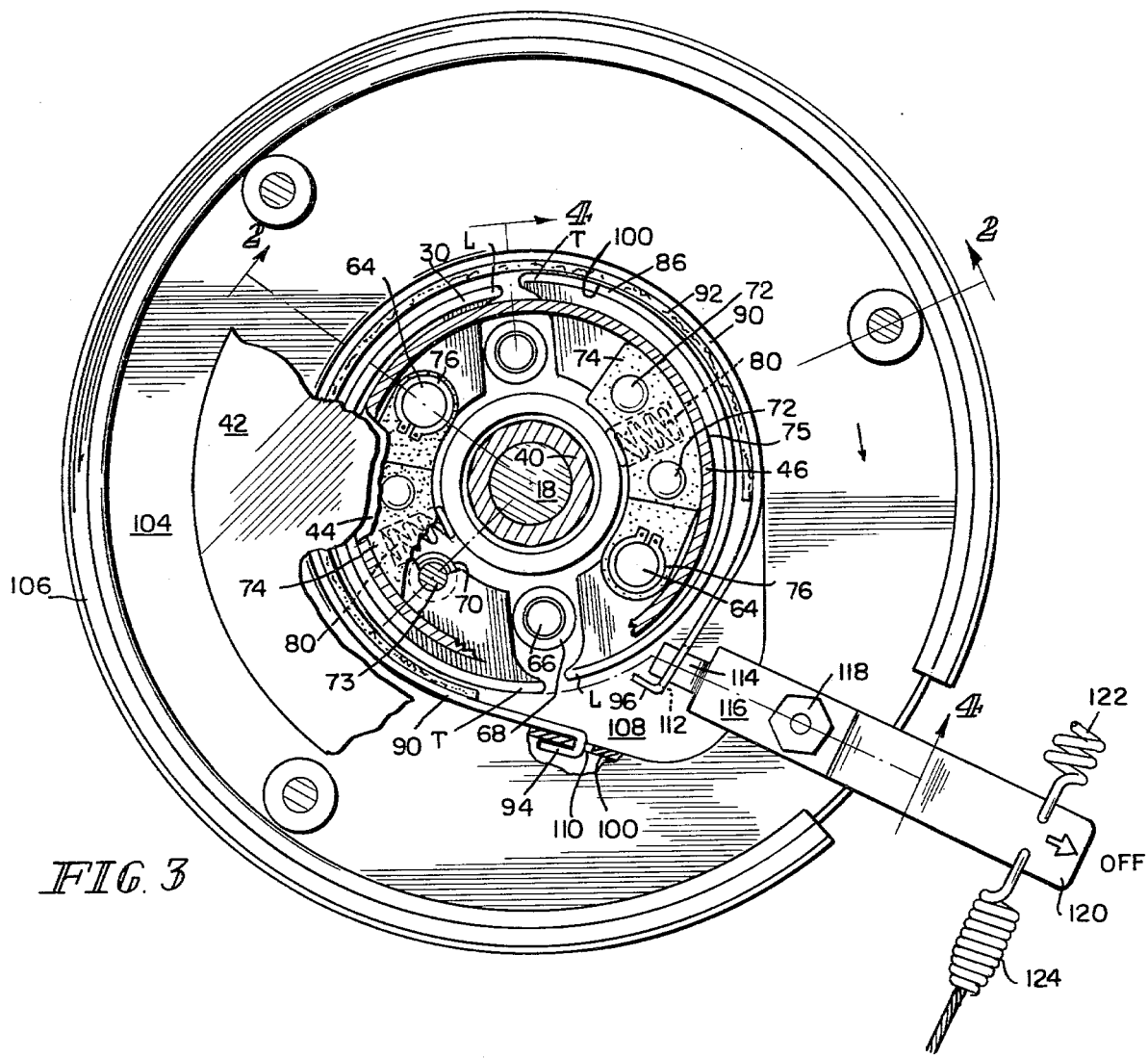
FIG. 3 is a horizontal section taken substantially on the line 3—3 of FIG. 2, with parts broken away to show details of the clutch and brake mechanism, with the clutch engaged and the brake in disengaged position.

The hub 40 has a reduced lower end on which the inner race 48 of a ball bearing is mounted and clamped between a shoulder on the hub and an opposite shoulder on an annular spacer and blade keeper 50. The hub 40 and blade keeper 50 are held in assembled relation and secured to the shaft 18 by a bolt 52. The outer race 54 of the ball bearing supports a shoe carrier 56 which comprises an upper hat-shaped member 58 with a central cylindrical crown 57 engaged about and over the top edge of the outer race 54, and a bottom circular plate 60 fixed against the radial flange of the upper member 58 by means of rivets 62 formed integral with and supporting shoe pivot pins 64 as shown at the left in FIG. 2. In use, the two members 58 and 60 of the shoe carrier are also clamped together by two blade bolts 66 threaded into clinch nuts 68 fixed in openings in the outer flange portion of the upper carrier plate 58. As shown in FIG. 3, there are two such clinch nuts 68 located at diametrically opposite points between the ends of the clutch and brake shoes described below. As further noted below, the flange of the upper carrier member 58 also contains four clearance holes 70 for the heads of rivets 72 which secure the clutch shoes and brake segments together as described below. The carrier 56 lies with its crown 57 extending inward of the open end of the driving drum, in nested relation therewith, and with its flange 58-60 just below that open end.

Figure 7:
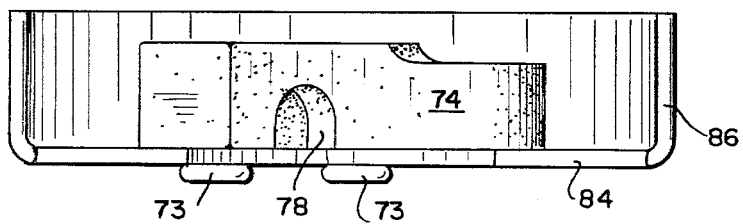
FIG. 7 is a side elevation of the shoe assembly shown in FIG. 6.

As shown in FIGS. 2 and 3, two clutch shoes 74 are pivotally mounted on the pivot pins 64 of the carrier 58-60, and held thereon by snap rings 76. The driving drum 46 rotates clockwise as viewed from above, as indicated by the arrow in FIG. 3, this clockwise rotation being the standard direction of rotation of the blades of rotary lawn mowers. In relation to this direction of rotation, the clutch shoes 74 are engaged at their leading ends with the pivot pins 64, and have arcuate drum-engaging contact surfaces 75 which begin at some distance behind the axes of the pivot pins 64 and, when engaged, extend rearward of the direction of rotation through a substantial arc about the axis of rotation so as to make full clutching engagement with the inside surface of the driving drum 46. In the arrangement shown, the leading edge of the arcuate clutch shoe contact surface 75 is spaced rearward approximately 30° from the radial plane containing the axis of the pivot pin 64, and the contact surface 75 extends through an arc of approximately twice that length. As shown in FIG. 2, each shoe 74 lies axially within the driving drum 46 and between it and the central cylindrical crown 57 of the upper carrier plate 58, and each shoe is formed with a spring pocket 78 containing a biasing spring 80 which reacts against that crown 57. The clutch shoes 74 are desirably formed of compressed and sintered powdered iron and are steam-processed to produce controlled oxidation in the pores of the sintered body. As shown in FIG. 7, the spring pocket 78 is formed as a U-shaped slot which opens through the bottom face of the shoe, and the spring is retained therein by the radial leg 84 of the attached brake shoe.

Figure 4:
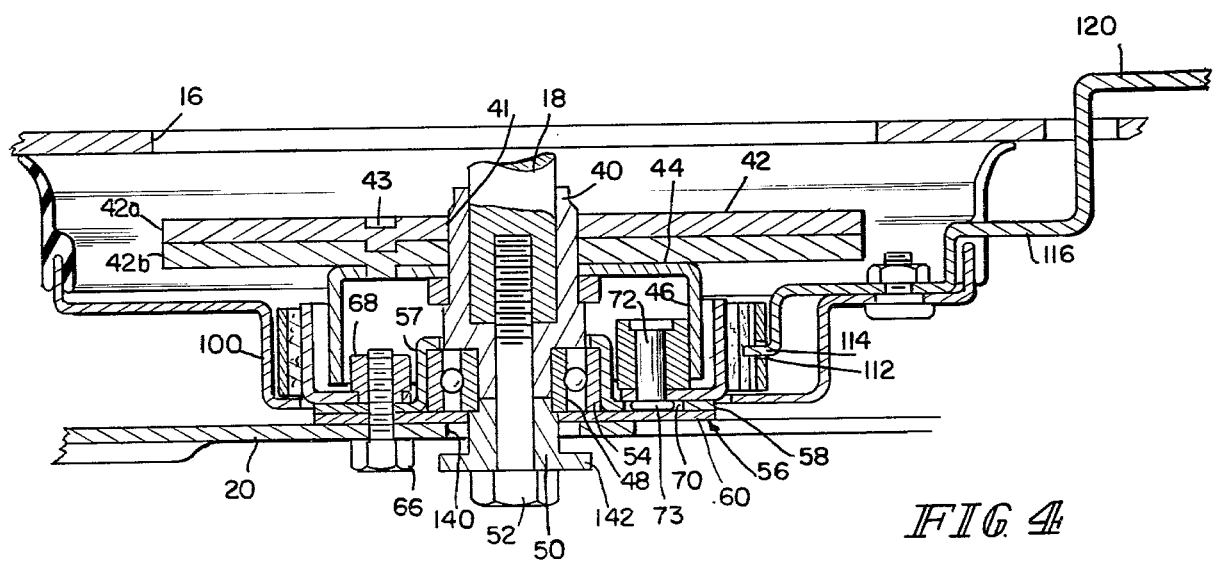
FIG. 4 is a section similar to that of FIG. 2 but taken on line 4—4 of FIG. 3 and showing the brake in ON position.

Each clutch shoe 74 is fixed to a brake shoe 82 of L-shaped cross section, comprising a bottom radial flange 84 which extends outward beyond the driving drum and there carries an upstanding arcuate wall forming a brake drum segment 86. The radial flange 84 underlies the clutch shoe 74 and is fixed to the clutch shoe by a pair of rivets 72 which have shouldered upper ends received in counterbored upper portions of the brake shoe and riveted over heads 73 against the bottom surface of the radial flange 84 of the brake shoe. As shown in FIGS. 3 and 4, the rivet heads 73 lie in pockets in the carrier 58-60, formed by the punched holes 70 in the flange of the upper plate 58 of that carrier. As shown in FIG. 2, the radial flange 84 also contains an opening which is pivotally engaged about the base of the pivot 64. The bottom face of the carrier serves as a blade-mounting face axially close to the clutch and the flywheel, and the compact assembly provides little overhang and can be supported directly on the engine shaft 18.

Figure 6:
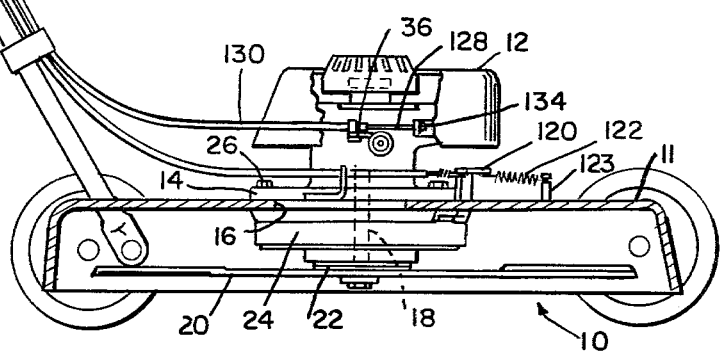
FIG. 6 is a plan view of a clutch and brake shoe assembly in accordance with the invention.
Figure 6:
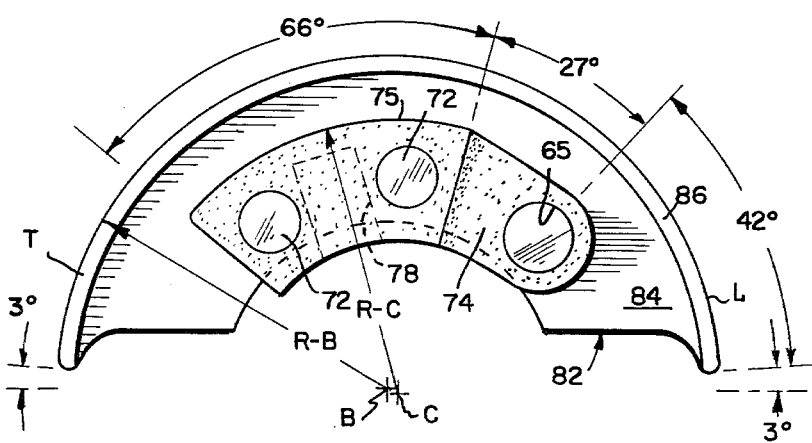

The construction of the combined clutch and brake shoe 82 is more particularly shown in FIGS. 6 and 7, where it will be seen that the engaging face 75 of the clutch shoe 74 lies on an arc of radius R-C about a clutch center C, that such face begins about 27° from the radial plane containing the axis of the pivot pin hole 65, and extends through an arc of about 66°. The brake shoe radial flange 84 lies flat against the bottom face of the clutch shoe 74 and extends beyond its ends, and the brake drum segment 86 extends in an arc on a radius R-B about a brake center B which is displaced a short distance from the clutch face center C. Such brake shoe segment extends through nearly 180°, and the clearance between the ends of the two brake drum segments when assembled as in FIG. 3 is preferably only sufficient for convenient manufacture when a full-circle brake drum is cut apart to form the two brake drum segments. As shown in FIG. 6, the ends of the segments are displaced from a transverse diameter through the brake center B by only about 3°, and the segment 86 extends through an arc of about 174°. The axis of the pivot hole 65 is angularly displaced from the leading end of the brake drum 86 by about 42°, so that it lies on a radius at an angle of about 45° to the diameter through the brake center B. This provides a substantial leading end portion of approximately one-quarter of the length of the brake drum segment 86 projecting forward from the pivot pin in the direction of rotation of the shoe in operation. The displacement of the brake center B from the clutch center C is such that the cylindrical outer surface of the brake is not concentric with the axis of rotation, but is swung clockwise about the pivot axis from a concentric position. In consequence, when the clutch shoes are engaged, the brake surface of each drum segment lies at a distance, from the axis of rotation and from the clutch center C, which progressively increases from the leading end L of the brake drum segment 86 toward its trailing end T. Desirably, the displacement between the two centers B and C is generally in a direction normal to the radial plane containing the center C and the axis of the pivot hole 65 and in a direction toward the trailing end portion of the brake drum segment. The axis of the pivot hole 65 lies at a shorter distance from the clutch center C than the clutch face 75, and as shown, may lie at a distance of about 80% of the radius R-C of the face 75.

Referring back to FIGS. 2-4, the brake drum segments are surrounded by a brake band 90 having a frictional lining 92 extending over an arc such that its opposite ends lie well within an arcuate distance less than the arcuate length of a brake drum segment 86. As shown, the brake drum segments extend through an arc of approximately 174° while the lining 92 has its ends spaced by an arcuate distance of less than 80°.

The brake band 90 is mounted within a surrounding generally circular wall 100 which it may engage as a limiting stop when expanded, and rests on an inward radial flange 102 at the bottom of such wall. The circular wall is part of the protective bowl 24, and depends from a horizontal wall 104 which extends outward beyond the circle of the engine-mounting bolts 26 so as to underlie the portion of the lawn mower deck 11 which borders the engine-mounting opening 16. The outer edge of the wall 104 is turned upward and carries a flexible gasket 106 which extends upward into engagement with the bottom surface of the deck. As shown in FIG. 3, the generally circular chamber defined by the wall 100 of the bowl 104 is extended radially outward at one side to form a brake actuation chamber 108 in the vicinity of the ends of the brake band 90. One end 94 of such band is anchored by hooking it through a slot 110 in the side wall 100, while the opposite or free end 96 of the brake band 90 is formed with a bent-over end and a central slot 112 which is engaged over the downward offset tongue 114 of a brake lever 116. As shown in FIGS. 3 and 4, such brake lever 116 is mounted on a headed rivet 118 fixed to the horizontal web 104 of the bowl 24, and beyond such rivet is bent and offset upward to clear the outer flange of the bowl 104 and to extend upward through the deck of the mower housing, where it is bent horizontally above such deck to provide a brake-actuating arm 120.

Figure 5:
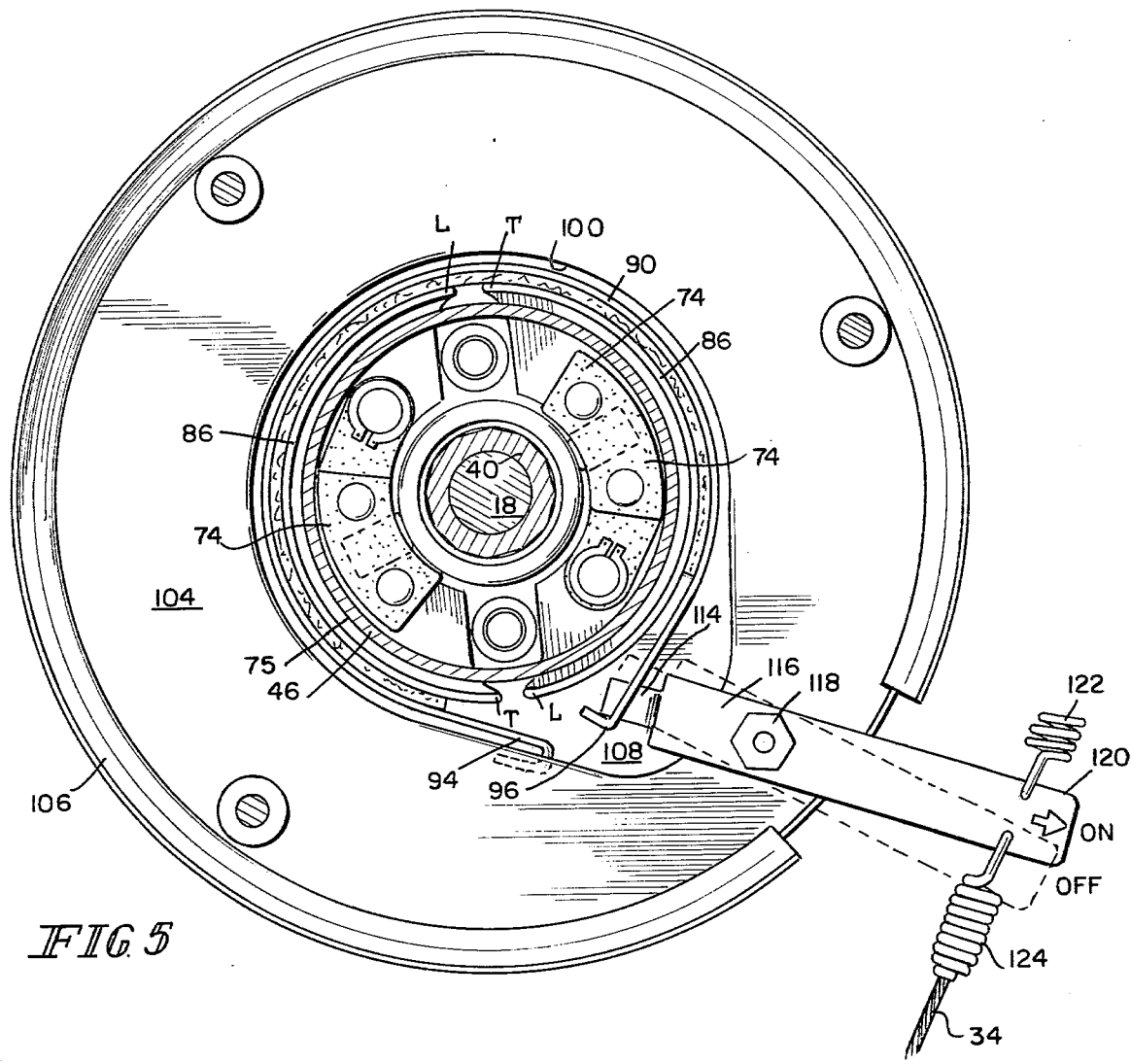
FIG. 5 is a plan view similar to FIG. 3, but with the brake in ON position.

The brake-actuating arm 120 is connected adjacent its end to a tension spring 122 anchored to a post 123 on the deck 11 of the mower housing 10, so that such spring tends to pull the brake lever 116 to its ON position shown in FIG. 5 in which the brake is applied and contracted about the brake drum segments 86 of the clutch-brake shoes. Such brake-actuating arm 120 is also connected through a tolerance spring 124 of higher tension than the spring 122 to the control cable 34 leading to the deadman control lever 32 on the handle of the mower, so that when such deadman lever is moved from its released position shown in full lines in FIG. 1 to its actuated position shown in dotted lines, the cable 34 will pull the brake-actuating arm 120 from its ON position shown in full lines in FIG. 5 to an OFF position shown in dotted lines in FIG. 5 and in full lines in FIG. 3, and thereby release the brake.

The shape and mounting of the bowl 24 relative to the deck 11 and its opening 16 facilitates the use of a maximum-sized flywheel and the desirable practice of mounting the clutch-brake assembly on the engine shaft 18 before mounting the engine on the mower housing 10. The industry uses a standard deck opening 16 of 6⅞ inch diameter, and the arrangement shown permits use of a flywheel of maximum diameter which will pass through such standard opening, for example, of 6¾ inch diameter. The peculiar need for and advantages of a flywheel as part of the assembly arise because mower engines are commonly built to rely on the blade for a major portion of their necessary flywheel action, and declutching the blade leaves the engine with insufficient flywheel to operate properly.

Operation of the blade-control mechanism is as follows. Consider first the conditions existing as shown in FIGS. 2 and 3, with the brake lever in OFF position, the brake band 90 lies expanded in clearance relation with the brake drum segments of the shoe assemblies, and the clutch shoes 74 of such assemblies are spring-pressed into initial clutching engagement with the driving drum 46. With the driving drum 46 rotating clockwise as shown by the arrow in FIG. 3, initial driving torque will be transmitted from the inner face of the driving drum 46 to the faces 75 of the clutch shoes 74, and the clutch shoes will thus be driven forward in the direction of rotation, with their pivot pins 64 at the leading ends of such shoes. Under these conditions, the shoes will be self-energizing, since the driving force applied to the clutch shoe faces 75 will tend to rotate the shoes 74 clockwise about the axes of their pivot pins 64, in the direction to increase the clutching engagement of the shoes 74 with the drum 46. Since the clutch shoes 74 are on the driven element of the clutch, it is necessary to force them into initial engagement with the drum 46, as by the springs 80, and this spring pressure is made sufficient to produce initial driving of the driven blade carrier and blade 20 under reasonable starting conditions, and may be varied to produce desirable engagement characteristics. In the mechanism shown where the driving drum had an inside diameter of 3½ inches and the clutch shoes had the relative proportions shown in the drawings, a prototype working embodiment used springs 80 with a thirty-pound spring force on the shoes. The driving force applied to the shoes 74 by the drum 46 is transmitted through the pivot pins 64 to the blade carrier 56, and thence to the blade 20. As the blade carrier and blade are rotated at progressively increasing speed, the clutch shoes 74 are acted on by centrifugal force to progressively increase their clutching engagement with the driving drum 46 so that at normal mowing speeds of, say, 2,000 rpm, a quite positive drive between the driving drum 46 and the driven blade carrier 56 is established.

Meanwhile, in this driving condition as shown in FIGS. 2 and 3, the brake drum segments 86, which are fixed to the clutch shoes 74 and pivotally movable therewith about the pivot pins 64, are swung clockwise about such pins as shown in FIG. 3. This clockwise movement carries their leading ends L inward from a true cylindrical position concentric with the axis of rotation, and carries their trailing ends T outward from such a true cylindrical position, so that the outer braking surfaces of such segments lie at a progressively increasing distance from the axis of rotation, from their leading ends toward their trailing ends. Also, while they clear the surrounding brake band 90 and its lining 92, they also lie at a progressively decreasing distance from that surrounding brake band, from their leading ends L to their trailing ends T. This brake-OFF and clutch-engaged condition will continue to exist as long as the mower operator holds the deadman control lever 32 in its actuated position shown in dotted lines in FIG. 1.

If the operator releases that lever 32, the brake spring 122 will pull the brake-actuating arm 120 to its brake-ON position as shown in FIG. 5. As the brake band 90 contracts in consequence of this movement, its lining 92 will first engage the trailing ends of the shoe brake segments which are outermost from the center of rotation and nearest the surrounding brake band, while the leading ends L of the brake drum segments 46 will remain in a somewhat retracted position, swung clockwise about their pivot pins 64, so that they will not initially engage the brake band lining 92 and will not tend to dig into that lining. As the brake band continues its contraction against the brake drum segments of the shoes, it will both exert a braking drag on those rotating drum segments, and will also mechanically force the trailing ends thereof to swing counterclockwise about their pivot pins 64 toward a true cylindrical position concentric with the axis of and against the bias of the clutch shoe biasing springs 80. This will produce an increasing area of engagement of the brake band lining 92 with the shoe segments 86, and the braking drag will tend to rotate the shoe assemblies about the pivot pins 64 to swing the clutch shoes 74 inward from their engaging positions with the driving drum 46 and swing the brake drum segments 86 inward toward a cylindrical position concentric with the axis of rotation. The braking reaction on the shoe assemblies thus energizes the shoe assemblies toward clutch-disengaged position as shown in FIG. 5. Desirably, the parts are so related that some portion of the shoe assembly abuts against a fixed portion of the blade carrier 56 when the brake drum segments 86 reach or approach their cylindrical position. Conveniently, such stop abutment is provided by engagement of the rear ends of the clutch shoes 74 with the cylindrical central crown 57 on the shoe carrier. When the shoe brake-drum segments 86 reach their cylindrical position as shown in FIG. 5, their leading ends L will have swung outward to or substantially to a cylindrical position where they will provide additional braking surface against the lining of the brake band 90, but will still not extend outward beyond a cylindrical position where they would tend to dig into the brake lining 92 of the brake band. With the brake ON, the clutch shoes will be positively and mechanically disengaged, independently of engine speed, so that the engine can be operated at any desired speed as to drive a self-propelled mower for transport.

When the deadman lever is again swung from released position to activated position, the cable 34 will pull the brake-actuating lever 120 to its brake-OFF position, and will release the brake band from engagement with the shoe brake-drum segments 86. This will allow the shoe assemblies to swing outward under the influence of the shoe-biasing springs 80 into engagement with the inner face of the driving drum 46. The clutch shoes 74 are desirably made as powdered iron parts which are compressed and sintered and may then subsequently be steam-treated to harden and toughen them. With such shoes, the driving drum 46 desirably has a hardened steel inner face. This relationship of sintered iron shoes operating against a hardened driving clutch drum face and in the relationship shown, with the pivot pins 64 for the shoes at their leading ends in the direction in which they are being driven by the driving drum 46, produces an especially smooth clutch engagement sufficient to initiate rotation of the driven blade carrier and blade without grabbing, and thereafter to progressively increase the driving force both by reason of the self-energizing action of the shoes 74 against the driving drum 46 and also by reason of the progressively increasing centrifugal force acting on such shoes 74. The centrifugal force is enhanced by the mass of the brake shoes 82, and their outlying brake-drum segments 86, and especially that part of such segments which lie toward the trailing ends thereof. The result is that the clutching engagement rapidly becomes a positive clutching engagement which persists through a wide range of engine speeds and even when the engine speeds are reduced by heavy cutting loads against the driven blade.

The spacer 50 which holds the inner race 48 of the ball bearing on the hub 40 and holds both on the shaft 18 may extend through an opening 140 in the center of the blade 20, as shown in FIGS. 2 and 4, and may be provided with an enlarged head 142 which obstructs disengagement of the blade from off the end of such spacer 50.

I claim:

1. A clutch-brake mechanism for mounting a lawn mower blade on a drive shaft and controlling the operation thereof, comprising in combination:

a rotary driving drum rotatable in a predetermined direction, a driven carrier rotatable on the axis of the drum, a pair of clutch-brake shoe assemblies pivotally mounted on said carrier and including clutch shoes positioned for engagement with the inner surface of the driving drum and brake drum segments positioned outward of said driving drum and connected for moving the clutch shoes to disengaged position, means for biasing the shoe assemblies to clutch-engaged position, and a brake band encircling said brake drum segments and engageable therewith to apply braking drag thereon and to mechanically move the segments in a direction to disengage the clutch shoes, said shoes being pivotally mounted on the carrier at the leading ends thereof in the direction of rotation so as to cause the same to have a self-energizing action when engaged with the driving drum, said driving drum being of steel, and each shoe being of compressed and sintered powdered iron and having an arcuate drum-engaging face of limited area on a radius greater than the radial distance from the drum axis to the shoe pivot axis and spaced rearward of such pivot axis and extending over an arcuate length approximately twice the angular length of such rearward spacing, the brake drum segments having brake faces which extend in a trailing direction from the shoe pivot axis a substantial distance beyond said shoe faces and have leading portions which extend forward a substantial distance beyond said pivot axis, and said brake faces being disposed to lie at a distance from the axis of rotation which progressively increases from their leading ends to their trailing ends so as to be initially engaged at their trailing ends by the encircling brake band as such band is contracted against them and thereby to be swung inward so as to disengage the clutch shoes.

2. Clutch-brake mechanism as in claim 1 in which said leading portions extend forward in the direction of rotation from the shoe pivot axis and swing about such pivot axis inward from concentricity with the axis of rotation of the carrier when the clutch shoes are engaged and outward toward such concentricity when the trailing ends of the segments are moved inward, and said leading portions of the brake segments have a length of between one-fifth and one-third the total length of the segments.

3. Clutch-brake mechanism as in claim 1 in which said clutch shoes extend rearward from their pivot axes through an angle of the order of 90 degrees.

4. Clutch-brake mechanism as in claim 2 in which the brake drum segments are substantially semicircular in length and the leading portions thereof have a length of approximately one-fourth the total length of the segments.

5. Clutch-brake mechanism as in claim 1 which further comprises a hub adapted to be mounted on a driving shaft, the driving drum being non-rotatably mounted on the hub, and the carrier being rotatably mounted on the hub.

6. Clutch-brake mechanism as in claim 5 with the addition of a flywheel mounted on the hub in fixed relation with the driving drum.

7. Clutch-brake mechanism as in claim 5 with the addition of an anti-friction bearing having inner and outer races, the inner race thereof being mounted on the hub and the carrier comprising a hat section having an inner cylindrical crown portion engaged about and overlying the upper end of the outer race and having a radial flange portion closely adjacent the open end of the drum, the carrier further comprising a plate member fixed to said flange portion and underlying the outer race so as to support the carrier on such outer race, the shoe assemblies being pivotally mounted on the flange and plate portions of the carrier.

8. Clutch-brake mechanism as in claim 1 which further comprises means for mounting the driving drum on the driven shaft with its cylindrical drum portion extending axially, the carrier having an axially extending inner portion by which it is mounted for rotation coaxially with the drum and which lies in nested relation with the driving drum, said carrier also having a radial flange portion closely adjacent the open end of the driving drum, shoe pivot means extending axially inward from said flange and within said driving drum, the clutch shoes being pivotally mounted thereon radially between the axially extending inner portion of the carrier and the driving drum within which such portion is nested, said flange portion of the carrier having means for mounting a lawn mower blade against the outer face thereof in close, axially spaced relation with the mounting portion of the carrier.

9. Clutch-brake mechanism as in claim 8 wherein said brake drum segments have radial flange portions lying against the face of the carrier flange, extending outward therefrom across the end of the driving drum and supporting the brake drum segments radially outward of such drum, the clutch shoes being fixed to said radial flange portions radially inward of such drum, and both such shoes and flange portions being pivotally engaged with said shoe pivot means.

10. Clutch-brake mechanism for mounting a rotary lawn mower blade on a drive shaft and controlling the operation thereof, comprising a driving member having a cylindrical drum, and means for mounting the same on the shaft for rotation therewith in a predetermined direction, a driven carrier, comprising a hat-shaped section having a central crown portion and a radial flange portion, the flange portion lying close to the open end of the drum and the crown portion extending toward said driving member and inward into nested relation with the open end of the drum, an anti-friction bearing having inner and outer races, means for mounting the inner race on said shaft, the outer race being received in said crown portion, against an upper end portion thereof, and extending into substantial axially overlapping relation with said drum, a retainer plate fixed to the flange portion of the hat-shaped section and retaining said outer race in said crown portion, the carrier being thereby mounted for rotation coaxially and in close coupled relation with said driving member, means to mount a lawn mower blade to the carrier flange portion formed by the flange of said hat-shaped section and said retainer plate, a plurality of clutch-shoe assemblies pivotally mounted on pivot means carried by the flange portion of the carrier, including clutch shoes disposed in axially overlapping relation with said crown portion and between the crown portion and the driving drum, each extending rearward of the direction of rotation from its pivot axis and having an arcuate clutch face rearward of such pivot axis for clutching engagement with the inside face of the drum, said assemblies also including brake shoes having radial flange portions fixed to said clutch shoes for movement therewith, and brake drum segments supported by such flange portions radially outward of said drum, each drum segment including a load trailing end portion extending rearward of the direction of rotation from its pivot axis in an arc about a center offset from the clutch shoe face center so that when the clutch shoes are engaged, the brake drum segments are swung outward about their pivot axes from a position concentric with the axis of rotation and lie at a distance therefrom which progressively increases in the direction from their leading ends to their trailing ends, and a brake band encircling the brake drum segments and adapted to be contracted thereagainst, the said disposition of the brake drum segments being such that the band first engages the trailing and outermost portions of the segments to apply braking drag thereto and mechanically swing the same inward and thereby move the clutch shoes out of engagement with the driving drum so as to declutch the carrier from the driving member and brake it to a stop without stopping the rotation of the driving member.

11. Clutch-brake mechanism as in claim 10 with the addition of shoe-biasing springs nested in said clutch shoes and reacting against the crown portion of the carrier to bias the clutch shoes outward into engagement with the driving drum.

12. Clutch-brake mechanism as in claim 10 which comprises two shoe assemblies mounted on diametrically opposite pivots on the carrier flange, the said brake drum segments together extending into close clearance relation with each other so as to present a substantially complete cylindrical surface for engagement by said brake band, the ends of said shoe assemblies being formed inwardly of said drum segments and the driving drums to provide clearance spaces for blade-mounting elements, and a pair of blade-mounting elements fixed to the flange portions of the carrier in said clearance spaces.

13. Clutch-brake mechanism as in claim 12, further comprising a hub adapted to be mounted on a driving shaft and on which the driving drum is mounted at one end, said hub having a reduced end extending into the crown portion of said carrier, the inner race of said anti-friction bearing being mounted between such reduced end and crown portion and supporting the carrier for rotation relative to the hub.

14. Clutch-brake mechanism as in claims 1, 2, or 8 wherein the clutch shoes are steam-treated, powdered-iron parts.

15. Clutch-brake mechanism as in claim 10 in which said pivot means are pins having reduced end portions extending through and fixed to the radial flange of said carrier hat section and the retainer plate so as to secure the same together and to be supported thereby.

16. A clutch-brake mechanism for mounting a driven element such as a lawn mower blade on a drive shaft and controlling the operation of such blade, comprising a driving rotor fixed on the shaft and having a peripheral flange for engagement by radially outward moving clutch shoes, a driven rotor having a hat-shaped section with a radial brim flange and a central crown portion extending from said flange toward and into proximity with said driving rotor, an anti-friction bearing having an inner race mounted on said drive shaft and an outer race received in said central crown portion and having one end engaged against such crown portion, a retaining plate mounted to said radial brim flange and engaged with the opposite end of said outer race, the driven rotor being thereby mounted for coaxial rotation in closely spaced relation with the driving rotor, a plurality of clutch-brake shoes pivotally mounted on the radial flange portion of said driven rotor in axially overlapping relation with said crown portion, said shoes having clutch faces of limited area angularly spaced from the pivot axes thereof, the shoes being pivotally movable outward to carry said faces against the peripheral flange of the driving rotor to drivingly connect the driven rotor thereto, means to bias the shoes outward into engagement with said flange, said shoes having brake portions positioned radially outward of said driving rotor and defining outward-presented brake faces, and braking means movable into engagement with said brake faces and operative both to apply retracting force to the shoes and to apply braking force thereto so as to exert braking force on the driven rotor, and means for attaching a driven element such as a lawn mower blade to the outer face of said driven rotor for rotary operation in a plane close to said anti-friction bearing and in closely spaced relation with said driving rotor.

* * * * *

UNITED STATES PATENT AND TRADEMARK OFFICE
CERTIFICATE OF CORRECTION

PATENT NO. : 4,326,368

DATED : April 27, 1982

INVENTOR(S) : Stephen J. Hoff

It is certified that error appears in the above-identified patent and that said Letters Patent are hereby corrected as shown below:

Column 3, line 55, change "36" to --35--.

Column 3, line 56, change "level" to --lever--.

Column 11, line 26 (claim 10), change "load" to --long--.

Signed and Sealed this

Third Day of August 1982

[SEAL]

Attest:

Attesting Officer

GERALD J. MOSSINGHOFF

Commissioner of Patents and Trademarks